United States Patent [19]

Kautzky

[11] 4,207,551

[45] Jun. 10, 1980

[54] PRESSURE TRANSDUCER

[76] Inventor: Hans Kautzky, 427 W. Blair, West Chicago, Ill. 60185

[21] Appl. No.: 831,690

[22] Filed: Sep. 8, 1977

Related U.S. Application Data

[62] Division of Ser. No. 666,201, Mar. 12, 1976, abandoned.

[51] Int. Cl.$^2$ ............................................. G01L 1/22
[52] U.S. Cl. ........................................... 338/4; 338/36
[58] Field of Search ................ 338/2, 4, 36; 73/720, 73/726, 734

[56] References Cited

U.S. PATENT DOCUMENTS

| | | | |
|---|---|---|---|
| 2,420,148 | 5/1947 | Ostergren | 73/726 |
| 3,046,788 | 7/1962 | Laimins | 338/4 X |
| 3,479,739 | 11/1969 | Stedman | 29/620 |
| 3,527,099 | 9/1970 | Herceg | 73/393 |
| 3,772,628 | 11/1973 | Underwood et al. | 338/4 |

Primary Examiner—C. L. Albritton
Attorney, Agent, or Firm—Hill, Van Santen, Steadman, Chiara & Simpson

[57] ABSTRACT

A pressure transducer incorporates a tubular body symmetrical in two transverse directions, and two pairs of diametrically opposed active strain gages secured to a single surface of the body at equally spaced locations which maintain mechanical and electrical two-fold symmetry, oriented to respond to transverse tangential bending strain in the wall of the tubular body. The four strain gages are connected in a four-legged bridge circuit, which produces a large amplitude linear output signal which is compensated for first and second order errors, without hysteresis. The transducer has a very large safety factor against rupture and may be used in line with a conduit without impeding fluid flow. It is usable for all pressure ranges down to cryogenic temperatures, and may be welded in place with no seals as part of a conduit. It is highly sensitive, with improved resolution.

5 Claims, 4 Drawing Figures

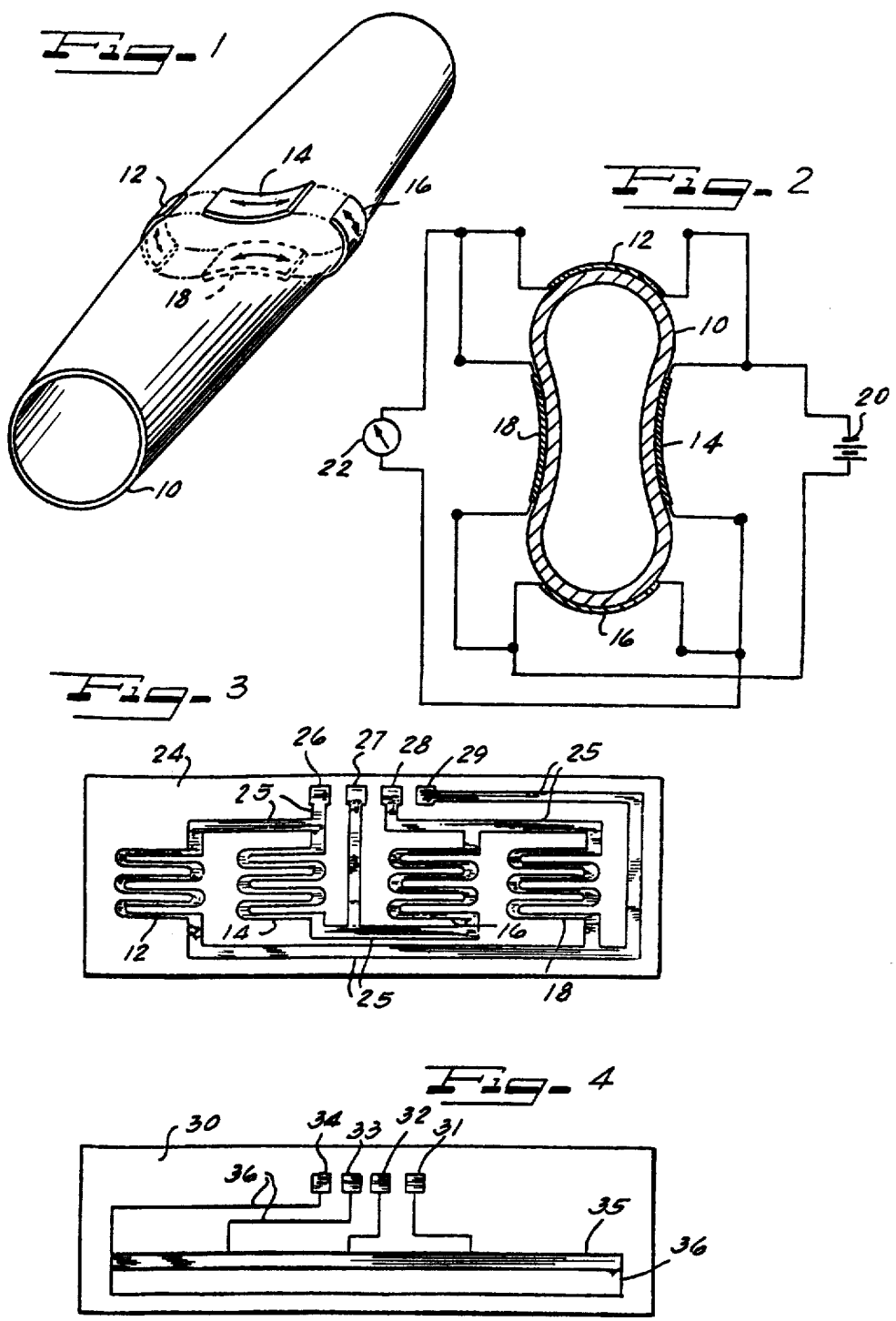

PRESSURE TRANSDUCER

This is a division of application Ser. No. 666,201 filed Mar. 12, 1976, now abandoned.

BACKGROUND

1. Field of the Present Invention

The present invention relates to pressure transducers and more particularly to pressure transducers employing strain gages.

2. The Prior Art

A variety of pressure transducers have been developed in the prior art, several of which employ plural active strain gages in a bridge circuit, along with passive elements which are responsive to temperature but not strain, in order to effect a temperature compensation. One such transducer is described in Swiss Pat. No. 549,794. While such prior art transducers are effective to reduce the effect of variation of temperature, they do not attempt to compensate for other error signals and display a large hysteresis, and so the attainable resolution is quite poor. They are not suitable for vacuum operation, and therefore cannot be leak-checked with the most accurate leak-checking techniques. They are also unsuitable for use in conditions of low temperature or high pressure.

Some of the pressure transducers known in the prior art also suffer from one or more of a variety of other disadvantages, including the need for a feed through capability to permit a strain gage mounted on one side of a surface to transmit a signal to the other side of the surface, and the need for movable seals or sealing mechanisms for sealing against the pressure being measured. These disadvantages are especially critical when the pressure transducer is to be used with toxic or radioactive gas or fluids. Special care is required to prevent leakage when the seals wear out or otherwise fail.

Another disadvantage of some pressure transducers is the tendency to produce output signals which vary in steps instead of continuously, which introduces hysteresis and limits the resolution of which such transducers are capable. Such hysteresis is generally caused by sliding seals or friction in mechanical linkages.

Another disadvantage of prior art pressure transducers is that they produce a relatively weak or low amplitude signal for a given change in pressure, so that resolution is also limited because of the signal-to-noise ratio of the output of the transducer.

Still another disadvantage of many prior art pressure transducers is that they must be connected to the vessel containing the fluid whose pressure is measured by means of flanges and fittings with seals or the like, and cannot be welded into place.

Also, some pressure transducers are not capable of responding quickly and accurately to changes in pressure, but produce a ringing or oscillating output signal in response to sudden pressure changes.

BRIEF SUMMARY OF THE PRESENT INVENTION

It is the principal object of the present invention to provide a pressure transducer which is not subject to the above disadvantages.

More specifically, one object of the present invention is to provide a pressure transducer design which compensates for most first and second order errors, which is generally insensitive to non-pressure related forces and disturbances.

Another object of the present invention is to provide a pressure transducer which is usable over the entire range from very low to very high pressures.

Another object of the present invention is to produce a pressure transducer in which there is a high degree of safety, with the burst strength of the transducer being many times greater than the stress which is normally placed on the pressure transducer during normal use.

A further object of the present invention is to provide a pressure transducer which automatically compensates for errors and nonlinearities in the characteristics of the active strain gage elements and their installation.

Another object of the present invention is to provide a pressure transducer which does not require any deformable seals or feed through devices.

A further object of the present invention is to provide a pressure transducer having a relatively high amplitude output signal, with a correspondingly good signal-to-noise ratio.

Another object of the present invention is to provide a pressure transducer which is capable of a high degree of resolution.

A further object of the present invention is to provide a pressure transducer which is usable at very low temperature, to measure pressures of cryogenic liquids and gases directly.

Another object of the present invention is to provide a combination strain gage which is relatively inexpensive to construct, and install.

A further object of the present invention is to provide a pressure transducer which has a rapid response without producing hysteresis in the output signal.

These and other objects and advantages of the present invention will become manifest by an inspection of the following description and the accompanying drawings.

In one arrangement of the present invention there is provided a hollow deformable body which is symmetrical about two orthoganal directions, with two pairs of diametrically opposed active strain gages attached to the exterior surface of the body at spaced locations which are symmetrical relative to the body, oriented to respond to transverse tangential strain, and with all four of the strain gages being interconnected in a full bridge arrangement.

BRIEF DESCRIPTION OF THE DRAWINGS

Reference will now be made to the accompanying drawings in which:

FIG. 1 is a perspective view of an illustrative embodiment of the present invention;

FIG. 2 is a transverse cross-section taken through the apparatus of FIG. 1, showing the strain gages connected in a full bridge;

FIG. 3 is an illustration of a ribbon supporting four prepositioned strain gages interconnected in a full bridge; and FIG. 4 is a diagrammatic illustration of a ribbon supporting a semi-conductor strain gage, with four taps forming a full bridge.

Referring first to FIG. 1, a pressure transducer incorporating an exemplary embodiment of the present invention has a hollow tube 10 with a noncircular cross-section, symmetrical in two orthogonal directions. The tube 10 is symmetrical about a vertical plane passing through its center line or axis, and is also symmetrical about a horizontal plane passing through the center line. This symmetrical relationship is sometimes hereinafter referred to as two-fold symmetry. Four strain gages 12, 14, 16 and 18 are mounted on the exterior surface of the tube 10, with the strain gages 12 and 16 diametrically opposed, and the strain gages 14 and 18 also diametrically opposed. All four strain gages are secured to the tube 10 at positions which maintain the two-fold mechanical symmetry of the transducer. As described hereinafter, the strain gages are also symmetrical electrically. These positions are sometimes hereinafter referred to as points of symmetry.

As shown in FIG. 2, the strain gages 12 and 16 are mounted on convex portions of the tube 10, while the strain gages 14 and 18 are mounted on concave portions thereof. When the pressure within the tube 10 is increased, the radius of curvature of the tube 10 at all portions tends to increase, with the convex portions becoming less convex and the concave portions becoming flatter or less concave, as the shape of the cross-section of the tube 10 tends toward a circle. Similarly, when the pressure decreases, the convex portions increase their convexity and the concave portions increase their concavity. The locations of the strain gages 12 and 16 are under compression for increased pressures, because of the bending strain in the wall of the tube 10, and the locations of the strain gages 14 and 18 are in tension. Accordingly, the two pairs of strain gages change their resistance in opposite directions for any change in pressure, giving outputs (viz, the resistance variations) which have opposite signs. In a bridge arrangement, as illustrated in FIG. 2, it will be seen that the different signs of the outputs of the strain gages 12 and 16, relative to the outputs of the strain gages 14 and 18, produce an additive effect, so that as much as a fourfold larger signal is available at the output of the bridge.

While the main signals (responsive to pressure) developed by the strain gages 12-18 are added in the bridge, most error signals are subtracted or cancelled out, because they induce equal and opposite effects in additive legs of the bridge. Such error signals result, for example, from outer forces, such as mechanical bending or twisting, pushing or pulling of the tube 10, and also nonlinearities such as differences in cementing the various strain gages to the tube 10, gage nonlinearities, material characteristics, etc.

The following table illustrates the ability of the present invention to ignore first and second order errors. In the following chart, A indicates a positive error, B indicates a negative error, and O indicates no error, for each of the four strain gages. In all of the conditions shown in the chart, no output signal is developed by the error.

| Gage | | | | | | | | | | | | | | | | | |
|---|---|---|---|---|---|---|---|---|---|---|---|---|---|---|---|---|---|
| 12 | B | O | O | A | A | O | A | B | B | O | A | B | O | A | B | B | O | A |
| 14 | A | B | A | O | O | A | A | O | B | O | A | B | O | A | B | O | B | B |
| 16 | A | O | A | B | O | O | O | A | A | A | B | B | B | O | O | B | B |
| 18 | B | A | O | O | A | B | O | O | A | A | B | B | B | O | B | O | A |

In FIG. 2 the bridge arrangement has a battery 20 connected across one pair of opposite terminals of the bridge, with a meter 22 connected across the other pair of bridge terminals. Any other indicator may be substituted for the meter 22, such as a digital type indicator. Variations in the resistance of the gages 12-18 as a result of temperature, affect all of the gages equally and therefore produce no additional signal. Nonlinearity of the characteristic of the strain gages 14-18 is also compensated for, because a reduced output contributed by the strain gages 12 and 16, is compensated for by a greater output contribution from the strain gages 14 and 18. In this way, linear operation of the assembly is extended into a much greater range than that attained by pressure transducers known in the prior art. Because of its error compensation characteristics, the pressure transducer of the present invention is also useful over an extremely wide range of temperatures, extending down to cryogenic temperatures, and an extremely wide range of pressures, from vacuum to ultra high pressures.

The relative sizes of the strain gages 12-18 are selected, in relation to the curvature of the concave and convex portions of the tube 10, so that the change in the levels of the outputs of all of the gages are equal for a given pressure change. Different length strain gages placed on the convex and concave portions of the tube 10 are preferable, where the radii of curvature of the convex and concave portions of the tube 10 are different, but an optional shape of the cross-section yields output signals which change equally, using gages of identical size and gage factor. Such a cross-sectional shape is one that has approximately the same radius of curvature for the concave and convex portions of the cross-section at the pressure being measured, or near the center of a range of pressure being measured.

The shape of the cross-section of the tube 10 may be referred to as peanut-like, when it has convex and concave portions, as shown in FIGS. 1 and 2. The principals of the present invention may be employed, however, with other cross-sectional shapes having two-fold symmetry, as long as they are noncircular, such as an elipse, a flattened oval, or the like. In each case, the strain resulting from increased pressure is in compression at the portions having the greatest convexity and in tension at the portions having the least convexity, so that the outputs of the two pairs of strain gages are of opposite sign, and equal in magnitude.

If it is desired that the bridge be balanced, with a zero meter reading at any given (null) pressure, a pair of resistors are connected in parallel with the two opposite arms of the bridge containing the pair of strain gages to be balanced, so that the resistance in all four arms is equal at such pressure. The output is then equal to the difference between the actual pressure and the null pressure. It is also possible to employ the present invention in a servo type bridge system, in which the value of an extra resistor, included in the bridge in series with one of the gages, is varied until the bridge becomes balanced, with the pressure being read from an indicator driven by the servo system which varies the resistor.

The tube 10 is preferably formed of steel or another metal with a high yield strength, and therefore a large range of elastic deformation. The wall thickness of the tube is chosen to supply ample burst strength, reached only after non-elastic deformation to a circular cross-section. The burst strength is considerably higher than the working range of the transducer. The ratio between the working pressure and the burst pressure is frequently called the safety factor. The safety factor of the present invention has been determined to exceed 100 for a peanut cross-section formed of stainless steel 304, working at a pressure of 150 p.s.i. This is much greater than the safety factors of existing transducers which hardly exceed 5.

The length of the tube 10 is chosen to be at least equal to the circumference of the tube 10, so the transducer is relatively insensitive to end effects. The tube 10 may be welded in place, so that no seals are necessary, and when positioned as part of a conduit, offers little restriction to flow of fluid therethrough.

The strain gages 14–18 are positioned on the tube 10 so as to be sensitive to tangential strain in a direction transverse to the center line of the tube.

Referring now to FIG. 3 a ribbon strain gage 24 is illustrated on which are supported for conventional strain gages 12, 14, 16 and 18. The four strain gages are connected in a bridge circuit, with each of the bridge terminals being connected to one of four output terminals 26–29. The interconnections are made by conductors 25 which are also supported on the same ribbon 24. Both the conductors 25 and the four gages themselves are preferably formed on the ribbon 24 by using conventional techniques in a single process, such as photoetching. A voltage source as the battery 20, is connected to two opposite terminals of the bridge, and an indicating device such as the meter 22 is connected to the other two terminals. The ribbon 24 is preferably formed of a thin flexible material which is secured to the tube 10 by cementing or the like. The strain pages 12–18 are evenly spaced apart by a distance equal to one quarter of the circumference of the tube with which it is to be used, so that, when secured to the tube, it forms the symmetrical arrangement illustrated in FIG. 2. The ribbon is preferably secured to the tube by adhesive means, as is customary in the art.

A different arrangement is illustrated in FIG. 4, where a ribbon of material 30 supports a thin fiber of semiconducting material 35 having electrically conductive taps along its length which are connected to four output terminals 31–34. The apparatus of FIG. 4 constitutes also a ribbon having four equally-spaced strain gages, as shown in FIG. 3, except that each strain gage is composed of a section of the same strand of semiconductor material 35. The conductors 36, to which the taps are connected, are also supported on the ribbon 30. Opposite ends of the semiconductor material 35 are connected together by the conductor 36, and this and three intermediate equally-spaced taps are connected with four terminals 31–34. The lengths of semiconductor material between adjacent taps function as separate strain gages, which permits the use of a single semiconductor strip to perform the same function as the four gages 12–18 illustrated in FIG. 3. In use, the ribbon 30 is cemented in place around the periphery of a tube 10, which has a circumference equal to the length of the ribbon. It is installed so that the completed assembly is symmetrically arranged, with the midpoints of each strain gage length between adjacent taps aligned with the points of symmetry of the tube 10. Such an assembly can be fabricated by known techniques, with the positions of the strain gage lengths fixed, relative to each other, so that with only cementing the assembly in place, the assembly is ready for use, with the heretofore required steps of pre-balancing and pre-testing, completed before installation.

The pressure transducer of the present invention can be employed for measurement of a variety of different pressures. Preferably relatively thick walls are provided for the tube 10 when large pressure differentials between the inside and outside of the tube 10 are to be measured, and relatively thinner walls are employed for the tube 10 when smaller pressure differentials are to be measured. It is also apparent that there is no need for any flexible seals or feed-throughs in the present invention.

When it is not desired to mount the tube 10 as a conduit for supporting fluid flow, one end may be closed by welding or the like, with the remaining end welded in place against a wall of the vessel containing the fluid whose pressure is to be measured, with an aperture in the wall of the vessel communicating to the interior of the tube 10, so that the same fluid pressure exists in both the vessel and the tube 10.

The present invention may be used for elevated temperature applications by using, for the strain gages 12–18, units which are capable of withstanding relatively higher temperatures, and soldering, braising or welding the strain gages, or their supporting ribbon 24, in place on the surface of the tube 10. Such special techniques for high temperature uses of strain gages are well known and need not be described in any greater detail.

Although the arrangement illustrated in FIG. 1 has all of the strain gages on the exterior of the tube 10, it is equally feasible to mount all of the strain gages on the interior thereof, when the voltage source 20 and the indicating device 22 are located within the tube 10, or when the interior of the tube 10 is at atmospheric pressure. Such an application arises when the tubular tube 10 is closed at one end and is inserted into the interior of a vessel through an aperture in the outside wall thereof.

The present invention is useful for measuring pressures inside and outside the body 10 relative to atmospheric pressure by the methods described above, and is also useful for measuring the differential pressure between two fluids acting on the interior and the exterior of the body 10.

It is apparent from the foregoing that the pressure transducer of the present invention is adapted for measuring pressure under a variety of conditions. The linear range of indication of the transducer is extended substantially beyond that available in the prior art, and a considerably larger continuously variable, high resolution output signal is produced. The resolution attainably with the present invention is on the order of one part in one million.

In an alternative embodiment of the present invention, the tube 10 is bowed so that it is curved along its length. One end of the tube is connected to the fluid whose pressure is to be measured, and the other end is closed by a suitable cap or seal. At least the center portion of the length of the curved tube has a noncircular, preferably peanut, cross-section, and the four strain gages are secured symmetrically to this portion, as described above. The curved tube tends to straighten out with increased pressure, and behaves exactly like the well known Bourdon tube, and can be used to give a mechanical indication of the pressure within the tube, with reference to a fixed scale which may be calibrated in units of pressure, as well known in the art. In this way, both a mechanical and an electrical indication of pressure is available. The bending of the tube does not affect the electrical indication developed by the present invention, because the error signals resulting from the bending of the tube cancel out, as described above.

It will be apparent to those skilled in the art that various modifications and additions may be made in the present invention, without departing from the essential features of novelty thereof, which are intended to be defined and secured by the appended claims.

What is claimed is:

1. A pressure transducer comprising a hollow metal tube having a noncircular cross-section with two-fold symmetry, and two pairs of diametrically opposed active strain gages mounted on a single surface of said tube at points of symmetry thereof, said strain gages each being aligned to respond to bending strain in a transverse tangential direction, said metal tube being adapted to be welded into fixed relation with a source of fluid whereby said transducer can respond to the pressure of said fluid.

2. A transducer according to claim 1, including electrical connecting means mounted on said ribbon for interconnecting said strain gages in a full bridge circuit.

3. A transducer according to claim 2, wherein said two pairs of strain gages comprise a single strand of semiconductor material having a plurality of equally spaced conductive taps along its length.

4. A method of making and installing a pressure transducer, comprising the steps of flattening diametrically opposed portions of a metallic tubular conduit to give said conduit a noncircular cross section, securing two pairs of strain gages at diametrically opposed portions of said conduit in symmetrical arrangement therewith, said strain gages each being aligned to respond to bending strain in a transverse tangential direction, and welding said conduit into fixed relation with a source of fluid, whereby said transducer can respond to the pressure of said fluid.

5. The method according to claim 4, wherein said strain gages are mounted on a flexible ribbon, including the step of securing said ribbon surrounding said conduit, whereby the spacing of said strain gages along the length of said ribbon accurately positions said strain gages at diametrically opposed positions relative to said conduit when said ribbon surrounds said conduit.

* * * * *